United States Patent
Riedel et al.

(10) Patent No.: US 9,318,863 B2
(45) Date of Patent: Apr. 19, 2016

(54) DEVICE AND METHOD FOR STRETCHING OR COMPRESSING LASER PULSES

(71) Applicants: Deutsches Elektronen-Synchrotron DESY, Hamburg (DE); GSI Helmholtzzentrum fuer Schwerionenforschung GmbH, Darmstadt (DE)

(72) Inventors: Robert Riedel, Hamburg (DE); Franz Tavella, Menlo Park, CA (US); Michael Schulz, Schenefeld (DE); Mark James Prandolini, Hamburg (DE)

(73) Assignees: Deutsches Elektronen-Synchroton DESY, Hamburg (DE); GSI Helmholtzzentrum fuer Schwerionenforschung GmbH, Darmstadt (DE)

( * ) Notice: Subject to any disclaimer, the term of this patent is extended or adjusted under 35 U.S.C. 154(b) by 0 days.

(21) Appl. No.: 14/682,754

(22) Filed: Apr. 9, 2015

(65) Prior Publication Data

US 2015/0295378 A1  Oct. 15, 2015

(51) Int. Cl.

| | |
|---|---|
| G02B 26/00 | (2006.01) |
| G02F 1/01 | (2006.01) |
| G02F 1/03 | (2006.01) |
| H01S 3/00 | (2006.01) |

(Continued)

(52) U.S. Cl.
CPC .............. *H01S 3/0057* (2013.01); *G02B 26/06* (2013.01); *G02B 27/0905* (2013.01); *H01S 3/0085* (2013.01); *G02B 27/0944* (2013.01); *G02B 27/0972* (2013.01); *G02B 27/0977* (2013.01)

(58) Field of Classification Search
USPC ......... 359/237, 238, 264, 290, 291, 292, 298, 359/299
See application file for complete search history.

(56) References Cited

U.S. PATENT DOCUMENTS

| | | | |
|---|---|---|---|
| 5,682,262 A | 10/1997 | Wefers et al. | |
| 6,785,303 B1 * | 8/2004 | Holzwarth et al. | 372/16 |

(Continued)

FOREIGN PATENT DOCUMENTS

WO  2010060460 A1  6/2010

OTHER PUBLICATIONS

Baltuska et al., "Visible pulse compression to 4 fs by optical parametric amplification and programmable dispersion control", Optics Letters, vol. 27, No. 5, pp. 306-308 (2002).

(Continued)

*Primary Examiner* — Joseph P Martinez
*Assistant Examiner* — Brandi Thomas
(74) *Attorney, Agent, or Firm* — Caesar Rivise, PC

(57) ABSTRACT

A laser pulse shaper device includes shaper unit including first dispersive element for spatially separating spectral components of laser pulses, second dispersive element for parallelizing and deflecting spectral components into Fourier plane of dispersive elements, and mirror for back-reflecting of laser pulses via dispersive elements, and light modulator in Fourier plane of dispersive elements, which is capable of modulating spectral components of laser pulses, wherein beam path of shaper unit includes forward beam path from first dispersive element via second dispersive element to mirror and return beam path from mirror via second dispersive element to first dispersive element, and focusing device is arranged at input side of forward beam path before first dispersive element for focusing spatially separated spectral components of laser pulses to Fourier plane of dispersive elements. Furthermore, a method for stretching or compressing laser pulses is described.

17 Claims, 1 Drawing Sheet

(51) Int. Cl.
*G02B 27/09* (2006.01)
*G02B 26/06* (2006.01)

(56) References Cited

U.S. PATENT DOCUMENTS

| | | | |
|---|---|---|---|
| 8,514,898 | B1 | 8/2013 | Pang |
| 2001/0026105 | A1 | 10/2001 | Torii et al. |
| 2006/0056468 | A1 | 3/2006 | Dantus et al. |
| 2007/0014317 | A1 | 1/2007 | Liu et al. |
| 2007/0268546 | A1* | 11/2007 | Resan et al. ............ 359/237 |
| 2008/0089698 | A1 | 4/2008 | Jiang et al. |
| 2011/0026105 | A1 | 2/2011 | Bayramian et al. |

OTHER PUBLICATIONS

Binhammer et al., "Prism-Based Pulse Shaper for Octave Spanning Spectra", IEEE Journal of Quantum Electronics, vol. 41, No. 12 (2005).

Fork et al., "Negative dispersion using pairs of prisms", Optics Letters, vol. 9, No. 5, pp. 150-152 (1984).

Naganuma et al., "50-fs pulse generation directly from a colliding-pulse mode-locked Ti:sapphire laser using an antiresonant ring mirror", Optics Letters, vol. 16., No. 10, pp. 738-740 (1991).

Riedel et al., "Long-term stabilization of high power optical parametric chirped-pulse amplifiers", Optics Express, vol. 21, No. 23, pp. 28987-28999 (2013).

Supradeepa et al., "A 2-D VIPA-Grating Pulse Shaper with a Liquid Crystal on Silicon (LCOS) Spatial Light Modulator for Broadband, High Resolution, Programmable Amplitude and Phase Control", 2010 23rd Annual Meeting of the IEEE Photonics Society, pp. 494-495.

Turner et al., "The coherent optical laser beam recombination technique (COLBERT) spectrometer: Coherent multidimensional spectroscopy made easier", Review of Scientific Instruments, vol. 82, pp. 081301-1-22 (2011).

* cited by examiner

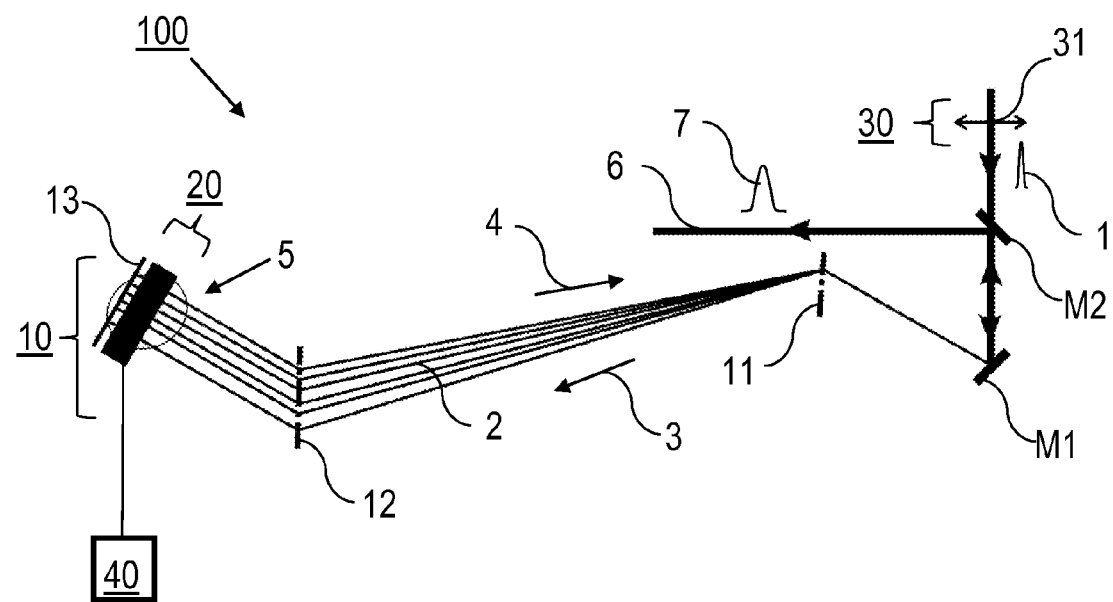

DEVICE AND METHOD FOR STRETCHING OR COMPRESSING LASER PULSES

BACKGROUND OF THE INVENTION

The invention relates to a laser pulse shaper device, which is configured for shaping laser pulses, in particular to a laser pulse shaper device including a shaper unit with dispersive elements and a light modulator for spectrally resolved modulating spectral components of the laser pulses. Furthermore, the invention relates to a shaping method for shaping laser pulses, in particular using an arrangement of dispersive elements and including a spectrally resolved modulation of the laser pulses. Applications of the invention are available in optical set-ups for stretching or compressing laser pulses, in particular in pulse amplifiers.

For describing the background of the invention, particular reference is made to the following publications:

[1] R. L. Fork et al. in "Optics Letters" vol. 9, 1984, p. 150-152;
[2] R. Naganuma et al. in "Optics Letters" vol. 16, 1991, p. 738-740;
[3] U.S. Pat. No. 8,514,898 B1;
[4] US 2001/026 105 A1;
[5] US 2007/014 317 A1;
[6] T. Binhammer et al. in "IEEE Journal of Quantum Electronics" vol. 41, 2005, p. 1552-1557;
[7] T. Baltuska et al. in "Optics Letters" vol. 27, 2002, p. 306-308; and
[8] R. Riedel et al. in "Optics Express" vol. 21, 2013, p. 28987-28999.

The generation of high-power ultrashort laser pulses (laser pulses having a pulse duration below 100 fs) by optical parametric pulse amplification (OPA), in particular using optical parametric chirped pulse amplification (OPCPA) and non-collinear OPA (NOPA), is generally known. Broadband seed laser pulses typically are amplified with narrowband pump laser pulses in a dielectric crystal. As the narrowband pump laser pulses have a longer pulse duration compared with the seed laser pulses, there is a need for temporal shaping the seed laser pulses to match the temporal pump laser pulse amplification window of the dielectric crystal. Typically, a pulse stretcher is used for stretching the seed laser pulses. The stretcher comprises a pair of dispersive prisms, which are arranged for spatially dispersing the spectral components of the seed laser pulses and re-collimating the dispersed components, as described e. g. in [1] to [5]. Along the beam path in the stretcher, the different spectral components have different beam path lengths resulting in a longer pulse duration. After the amplification, the ultrashort laser pulses are re-compressed using a pulse compressor. A pulse compressor also may comprise a pair of dispersive prisms which are arranged for introducing a chromatic dispersion to the laser pulses (see e. g. [7]).

Stretching the seed laser pulses does not only require a separation of the spectral components on a timescale, but also a control of the spectral phase and amplitude of the spectral components such that the ultrashort laser pulses can be formed by the re-compression after the OPA process. Correspondingly, there is an interest in controlling the spectral components of compressed laser pulses. It is generally known to use a spatial light modulator (phase mask) for controlling the spectral phase and amplitude of the dispersed spectral components with spatial resolution.

Conventionally, the tasks of stretching the seed laser pulses and controlling the spectral phase and amplitude are solved by separate measures. While the dispersive elements are optimized for stretching the pulses, a so-called "4-f-geometry" is used for the phase and amplitude modulation (see e. g. [6]). With the 4-f-geometry, the phase mask for spectrally resolved modulating spectral phases of the pulses is arranged in a Fourier plane of a combination of the dispersive elements and additional focusing elements. The 4-f-geometry has disadvantages in terms of a long beam path and therefore low stability of the spatial and temporal pulse properties. As a further disadvantage, a large amount of additional higher-order dispersion is added to the laser pulses, which may result in problems with the re-compression thereof.

A compact pulse compressor or stretcher can be obtained by an optical set-up including the dispersive elements and a mirror, as described e. g. in [7] and [8]. The mirror is arranged in a Fourier plane of the dispersive elements for a back-reflection of the compressed or stretched pulses via the dispersive elements. With the phase mask in the spectral Fourier plane, the spectral phase and amplitude of the spectral components can be manipulated. However, the conventional compressor or stretcher provides a diffusive line arrangement of the spectral components only. Accordingly, the manipulation in the spectral Fourier plane has a limited efficiency and precision only. This disadvantage even would be kept if the Fourier plane including the diffusive line would be imaged, e. g. with a cylinder lens onto the phase mask (as proposed in [8]) as the spatial resolution could not be improved by the focusing.

DESCRIPTION OF THE INVENTION

The objective of the invention is to provide an improved shaper device for temporal shaping ultrashort light pulses being capable of avoiding disadvantages of conventional techniques. In particular, it is an objective of the invention to provide a stretcher or compressor device with a compact design and an improved control of the spectral phase and amplitude of the light pulses, in particular with improved spectral resolution. Another objective of the invention is to provide an improved method for shaping ultrashort light pulses avoiding disadvantages and limitations of conventional techniques and in particular being capable of manipulating the spectral phase and amplitude of stretched or compressed light pulses with improved spatial and spectral resolution.

These objectives are solved with a shaper device and a shaping method of the invention.

According to a first general aspect of the invention, a laser pulse shaper device with negative dispersion is provided, which comprises a shaper unit including two dispersive elements and a mirror, which are arranged for a temporal shaping of laser pulses. Advantageously, different types of dispersive elements can be used as the dispersive elements, e. g. prisms and/or gratings. Furthermore, the shaper device comprises a light modulator, which is arranged in the spectral Fourier plane of the dispersive elements for a spatially resolved modulation of the spectral components of the laser pulses. The light modulator comprises a phase mask, which is capable of influencing the spectral phase and amplitude of the dispersed spectral components of the laser pulses in the Fourier plane. With a spatially resolved adjustment of the spectral phase and amplitude, a spectrally resolved adjustment of the spectral components is obtained.

According to the invention, the shaper device further comprises a focusing device (focusing optic), which is arranged on an input side of the shaper unit, i.e. in front of the first dispersive element. The laser pulses are subjected to the focusing effect of the focusing device before an in-coupling thereof to the dispersive elements. Furthermore, according to the invention, the focusing device is adapted for focusing the laser pulses to the spectral Fourier plane of the dispersive elements. As the spectral components of the laser pulses are spatially separated in the Fourier plane, the focusing device provides focused images of the spectral components in the spectral Fourier plane. According to the invention, the spectral Fourier plane of the dispersive elements simultaneously provides a spatial Fourier plane of the focusing device.

According to a second general aspect of the invention, a shaping method for shaping laser pulses with a shaper unit including a first dispersive element, a second dispersive element and a mirror is provided. The laser pulses are coupled into the shaper unit and spectrally dispersed (spatially separated) by the first dispersive element. Subsequently, the spectral components are collimated (parallelized) with the second dispersive element. The spectral components are deflected into a Fourier plane of the first and second dispersive elements. After reflection of the laser pulses at the mirror back to the second dispersive element, the spectral components are recombined at the second dispersive element and re-collimated at the first dispersive element. The laser pulses are subjected to a light modulation in the Fourier plane of the first and second dispersive elements, i.e. the spectral components are subjected to a spectral phase and amplitude modulation with spatial resolution in a plane across the beam path through the shaper unit between the second dispersive element and the mirror.

According to the invention, the laser pulses are focused into the shaper unit. Focusing is introduced before in-coupling the laser pulses at the first dispersive element. The laser pulses are focused such that the spatially separated spectral components are imaged in the Fourier plane of the first and second dispersive elements.

Advantageously, a focused image is generated in the Fourier plane of the dispersive shaper unit by using the focusing device in front of the first dispersive element. The spectral phase and amplitude modulation is provided in the focused Fourier plane. Contrary to the conventional diffusive line arrangement of the spectral components, the inventive focusing provides a focused line image of the spectral components. The spectral components provide a line of diffraction limited spots. Accordingly, contrary to the conventional techniques, a compact design of the optical set-up is obtained, while the spatial resolution of controlling the spectral components is increased. With the light modulation in the focused Fourier plane, individual spectral components (frequencies) of the light pulses can be manipulated with improved precision and sensitivity. The compact design obtained with a combination of the shaper unit and the amplitude and phase-modulating light modulator leads to an essential reduction of the beam path length and dispersion within the shaper device. Advantageously, this increases the stability of the output and reduces the amount of high-order dispersion added to the light pulses in the shaper device. With the increased spatial resolution of controlling the spectral components compared with the conventional techniques, spectral phase and amplitude control can be improved, which provides advantages even with regard to the optical parametric amplification of ultrashort light pulses in the sub-10-fs range.

According to a further essential advantage, the invention can be applied with both pulse stretching or compressing. The terms "shaping" or "shaper" refer to any change of the pulse duration obtained by dispersing the pulses (spatially separating the spectral components of the pulses), directing the spectral components along different spectral beam path lengths and recombining the spectral components of the pulses. Thus, the inventive pulse shaping includes one of pulse stretching and pulse compressing, and the shaper device comprises a stretcher or compressor device with negative dispersion.

Preferably, the focusing device comprises at least one reflective imaging element, e. g. mirror with curved surface, and/or at least one refractive imaging element, e. g. imaging lens. Advantageously, a plurality of variants is available for focusing the laser pulses with the reflective and/or refractive element(s). With a preferred example, the focusing device may comprise a telescope configuration with multiple lenses and/or mirrors. The telescope configuration may have advantages for focusing the laser pulses to the Fourier plane of the dispersive elements. With other preferred examples, the focusing device may consist of one single reflective focusing mirror or one single refractive focusing lens only. With these embodiments, advantages in terms of a compact design of the shaper device can be obtained.

Advantageously, a chromatic aberration of the focusing lens(es) does not impair the improved light modulation in the Fourier plane. Otherwise, the wavelength dependency of focusing the laser pulses can be avoided by using focusing mirror(s), having e. g. a parabolic mirror surface. Preferably, the light modulator 20 is arranged in a focus of the focusing device corresponding to a central wavelength of the laser pulses.

The shaper unit spans a beam path from the first dispersive element via the second dispersive element to the mirror (forward beam path) and back from the mirror via the second dispersive element to the first dispersive element (return beam path). According to a preferred embodiment of the invention, the forward and return beam paths can be slightly displaced relative to each other, so that an input side of the forward beam path and an output side of the return beam path are shifted relative to each other. Advantageously, this facilitates the out-coupling of the stretched pulses. Due to the deflections with the dispersing elements, each of the forward and return beam path sections spans a plane, and the displacement may include a parallel displacement of the forward and return beam path planes or a mutual tilting thereof.

According to preferred embodiments of the invention, the light modulator is adapted for modulating the spectral phases and/or the spectral amplitudes of the spectral components of the laser pulses. With a particularly preferred embodiment, both of the spectral phases and the spectral amplitudes are modulated simultaneously. To this end, the light modulator comprises a liquid-crystal spatial light modulator, a deformable mirror or a MEMS modulator device (MEMS: microelectromechanical system). Advantageously, these types of light modulators are capable of tuning the phases and amplitudes with a spatial resolution matched to the spatial resolution of the spectrally dispersed pulses in the focus plane of the focusing device. The light modulator for modulating the spectral phases and the spectral amplitudes can be directly coupled with the back-reflecting mirror of the shaper unit. If the deformable mirror is used, it can fulfil both functions of the back-reflecting mirror and the light modulator.

Alternatively, depending on the application of the invention, it may be sufficient to modulate the amplitudes of the spectral components only. With this embodiment, the light modulator may comprise a mask for partially shielding the spectral components of the laser pulses in the focus plane of the focusing device.

According to further preferred features of the invention, the shaper device may comprise a control device for controlling the light modulator. In particular, the light modulator can be controlled in dependency on a predetermined modulation scheme or in dependency on a detected pulse parameter. The modulation scheme can be provided in dependency on the application of the stretched pulses, e. g. for adjusting the spectral phases and amplitudes such that laser pulses can be formed by a recompression in a NOPA pulse amplifier.

BRIEF DESCRIPTION OF THE DRAWINGS

Further details and advantages of the invention are described in the following with reference to the attached drawings, which show in:

FIG. 1: a schematic illustration of a stretcher device according to a preferred embodiment of the invention.

Preferred features of the invention are described in the following with exemplary reference to a shaper device which is adapted for pulse stretching (stretcher device). The invention correspondingly can be applied with a shaper device which is adapted for pulse compressing (compressor device). Particular reference is made to the focused imaging of laser pulses to the Fourier plane of a shaper unit. Details of creating the laser pulses, the design and arrangement of the dispersive elements and the application of the stretched or compressed pulses, e. g. in a pulse amplifier, are not described as far as they are known from conventional prior art related to the shaping of laser pulses. It is emphasized that the implementation of the invention is not restricted to the optical set-up as shown in FIG. 1, but rather possible with a modified optical set-up, including e. g. additional optical components for spectrally dispersing, imaging and/or monitoring purposes.

According to FIG. 1, the laser pulse shaper device 100 comprises a shaper unit 10, a light modulator 20 and a focusing device 30. Furthermore, FIG. 1 schematically shows a control device 40, which is arranged for controlling the light modulator 20.

The shaper unit 10 includes a first dispersive element 11, a second dispersive element 12 and a reflecting mirror 13 arranged in a Fourier plane 5 of the dispersive elements 11, 12. The first dispersive element, e. g. a prism, like a quartz prism, is used to fan out the spectral components 2 of laser pulses 1 coupled into the shaper unit 10. The spectral components 2 are deflected to the second dispersive element 12, which comprises e. g. a prism, in particular a quartz prism, as well. With the second dispersive element 12, the spectral components 2 of the laser pulses 1 are parallelized and deflected to the mirror 13.

The beam path of the laser pulses 1 has two sections, comprising the forward beam path 3 from an input side via a plane deflecting mirror Ml, the first dispersive element 11 and the second dispersive element 12 to the mirror 13, and a return beam path 4 from the mirror 13 via the second dispersive element 12, the first dispersive element 11, the deflecting mirror M1 and a second deflecting mirror M2 to an output 6. The forward beam path 3 is not influenced by the second deflecting mirror M2, which is arranged at another beam position compared with the input side of the forward beam path 3.

The mirror 13 comprises a plane mirror, made of e. g. a silver coated glass substrate. It is arranged having a reflecting surface perpendicular or with a tilting angle relative to the beam path in the shaper unit 10, i.e. essentially parallel to the Fourier plane 5. If the plane mirror 13 is tilted, the forward beam path 3 and the return beam path 4 are tilted relative to each other. The tilting angle, e. g. below 1°, is selected such that the forward and return beam paths 3, 4 do not overlap at an input/output side of the shaper unit 10. As an example, the tilting angle of 1° provides a displacement of 10 mm at the input/output side of a shaper unit 10 having a beam path length of 1 m. Alternatively, the mirror 13 may comprise a retro-reflector, which introduces the displacement of the reflected beam relative to the incident beam, so that the forward and return beam paths 3, 4 are parallel to each other.

Accordingly, depending on the type and arrangement of the mirror 13, the forward and return beam path sections span a common plane or slightly displaced planes (horizontal plane or nearly horizontal planes). As the Fourier plane 5 is arranged in the horizontal planes and the optional tilting of the mirror 13 is directed perpendicular to the horizontal planes of the forward and return beam path sections, the mirror tilting does not influence the effect of the light modulator 20.

The light modulator 20 comprises a line-shaped liquid-crystal spatial light modulator SLM (e. g. type: SLM-S640/640d, manufacturer: Jenoptik, Germany). Optionally, the SLM can be combined with a pair of vertical masks, which are arranged perpendicular to the beam path in the shaper unit 10 and used for a spectral clipping in the Fourier plane 5. With a further modification, the light modulator 20 can be provided by the mirror 13 itself. In this case, the mirror is a deformable mirror adapted for subjecting the spectral components of the light pulses to different path lengths in the shaper unit 10. As an example, the deformable mirror is the device type DM97-08, manufacturer: ALPAO SAS, France.

The focusing optic 30 comprises e. g. multiple lenses or one single lens 31, which are used to arrange the spectral components 2 in a focused line in the Fourier plane 5 of the shaper unit 10. The focal length of the focusing device 30 equals the sum of the distance from the focusing device 30 to the first dispersive element 11, the distance between the dispersive elements 11, 12 and the distance between the second dispersive element 12 and the light modulator 20. With practical examples, the focal length is selected in dependency on the shaper design and in particular the apex distance of the prisms, e. g. in a range of 1 to 2 m.

With a practical application of the invention, the shaper device 100 is arranged in a seed pulse path of a NOPA pulse amplifier (not shown). Laser pulses 1 comprise seed pulses with a duration of e. g. 10 fs, which are to be stretched to stretched pulses 7 with a duration of e. g. 1 ps. The seed pulses run along the forward beam path section 3, so that the spectral components 2 are separated and parallelized with the first and second dispersive elements 11, 12, resp. Phase and amplitude modulation of the spectral components 2 is introduced even in the focus plane of the focusing optic 30, using the light modulator 20. The spectral phases and amplitudes of the spectral components 2 are adjusted with the control device 40 in dependency on a stored modulation scheme. Alternatively, the control device 40 can be connected with a monitoring equipment of the NOPA pulse amplifier thus allowing a loop control of the light modulator 20 in dependency on the pulse parameters of amplified pulses created with the NOPA pulse amplifier.

The features of the invention disclosed in the above description, the drawing and the claims can be of significance both individually as well as in combination for the realization of the invention in its various embodiments.

What is claimed is:

1. A laser pulse shaper device, being configured for shaping laser pulses, comprising
 a shaper unit with negative dispersion, including a first dispersive element for spatially separating spectral components of the laser pulses, a second dispersive element for parallelizing and deflecting the spatially separated spectral components into a Fourier plane of the first and second dispersive elements, and a mirror for back-reflecting of the laser pulses via the second and first dispersive elements, and a light modulator being arranged in the Fourier plane of the first and second dispersive elements, wherein the light modulator is capable of modulating the spectral components of the laser pulses, wherein a beam path of the shaper unit includes a forward beam path from the first dispersive element via the second dispersive element to the mirror and a return beam path from the mirror via the second dispersive element to the first dispersive element, a focusing device is arranged at an input side of the forward beam path before the first dispersive element, and the focusing device is adapted for focusing the spatially separated spectral components of the laser pulses to the Fourier plane of the first and second dispersive elements.

2. The laser pulse shaper device according to claim 1, wherein the focusing device includes
a configuration of at least one of multiple reflective and refractive elements, or
one single reflective focusing mirror, or
one single refractive focusing lens.

3. The laser pulse shaper device according to claim 2, wherein the configuration of at least one of multiple reflective and refractive elements is a telescope configuration.

4. The laser pulse shaper device according to claim 1, wherein
the first and second dispersive elements and the mirror are arranged such that the input side of the forward beam path and an output side of the return beam path are displaced relative to each other.

5. The laser pulse shaper device according to claim 1, wherein
the light modulator is adapted for modulating at least one of the spectral phases and the amplitudes of the spectral components of the laser pulses.

6. The laser pulse shaper device according to claim 4, wherein
the light modulator comprises a spatial light modulator, a deformable mirror or a MEMS modulator device.

7. The laser pulse shaper device according to claim 6, wherein
the mirror is the deformable mirror of the light modulator.

8. The laser pulse shaper device according to claim 1, wherein
the light modulator comprises a mask for partially shielding the spectral components of the laser pulses.

9. The laser pulse shaper device according to claim 1, comprising at least one of the features
a control device is provided for controlling the light modulator in dependency on a predetermined modulation scheme or a detected pulse parameter,
the first and second dispersive elements comprise prisms or gratings,
the laser pulse shaper device is a pulse stretcher device, and
the laser pulse shaper device is a pulse compressor device.

10. A shaping method for shaping laser pulses with a shaper unit with negative dispersion, including a first dispersive element, a second dispersive element and a mirror, wherein a beam path of the shaper unit includes a forward beam path from the first dispersive element via the second dispersive element to the mirror and a return beam path from the mirror via the second dispersive element to the first dispersive element, comprising the steps of
in-coupling the laser pulses along the forward beam path and spatially separating spectral components of the laser pulses using the first dispersive element,
parallelizing the spatially separated spectral components using the second dispersive element, wherein the spatially separated spectral components are deflected into a Fourier plane of the first and second dispersive elements,
reflecting the laser pulses at the mirror along the return beam path back to the second dispersive element,
spatially recombining the spectral components of the laser pulses at the second dispersive element, and
parallelizing the recombined spectral components and out-coupling the laser pulses using the first dispersive element, wherein
the laser pulses are subjected to a light modulation in the Fourier plane of the first and second dispersive elements, said shaping method further including the step of
focusing the spatially separated spectral components of the laser pulses to the Fourier plane of the first and second dispersive elements with a focusing device being arranged at an input side of the forward beam path before the first dispersive element.

11. The shaping method according to claim 10, wherein the laser pulses are focused using
a configuration of at least one of multiple reflective and refractive elements, or
one single reflective focusing mirror, or
one single refractive focusing lens.

12. The shaping method according to claim 11, wherein the laser pulses are focused using the configuration of at least one of multiple reflective and refractive elements, which is a telescope configuration.

13. The shaping method according to claim 10, including the step of
displacing the input side of the forward beam path and an output side of the return beam path relative to each other.

14. The shaping method according to claim 10, wherein the light modulation includes at least one of
modulating at least one of the spectral phases and the amplitudes of the spectral components of the laser pulses, and
partially shielding the spectral components of the laser pulses.

15. The shaping method according to claim 13, wherein the laser pulses are modulated with a spatial light modulator, a deformable mirror or a MEMS modulator device.

16. The shaping method according to claim 10, wherein the mirror is used as the deformable mirror.

17. The shaping method according to claim 10, comprising at least one of the features
the light modulation is controlled in dependency on a predetermined modulation scheme or a detected pulse parameter, and/or
the laser pulses out-coupled from the shaper unit are temporarily stretched or temporarily compressed relative to the laser pulses in-coupled to the shaper unit.

* * * * *